Feb. 21, 1939.                S. H. GEFFNER                2,147,646
                         BEVERAGE BREWING DEVICE
                          Filed June 3, 1936           2 Sheets-Sheet 1

INVENTOR.
SAMUEL H. GEFFNER
BY Henry L. Burkitt
ATTORNEY.

Feb. 21, 1939.   S. H. GEFFNER   2,147,646
BEVERAGE BREWING DEVICE
Filed June 3, 1936   2 Sheets-Sheet 2
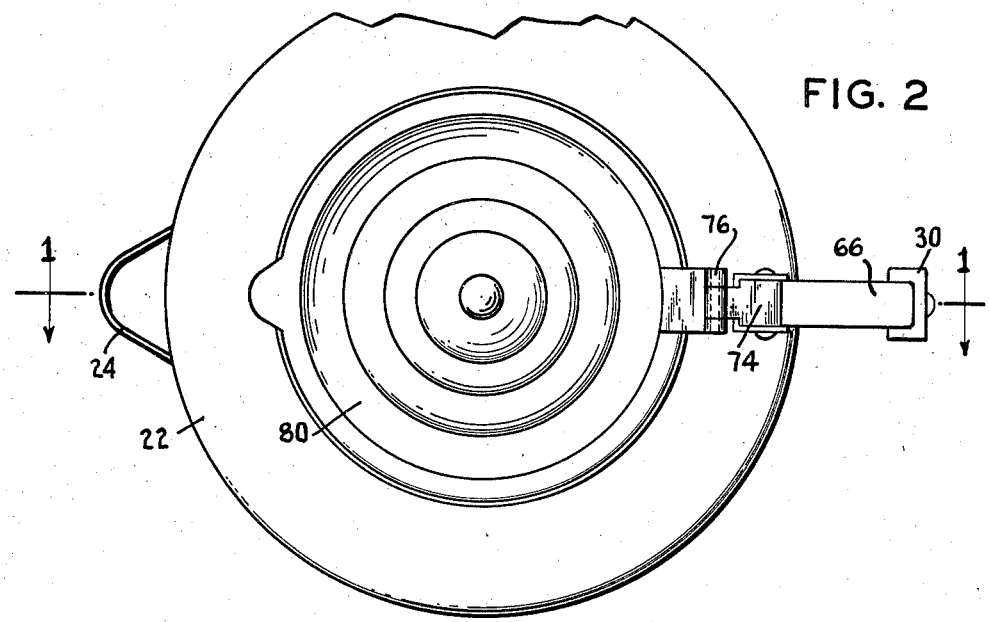
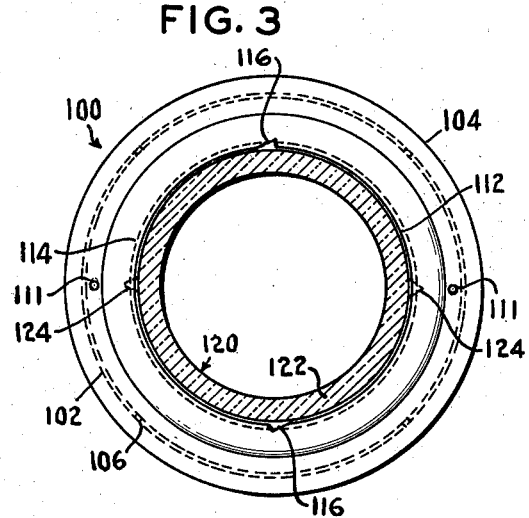
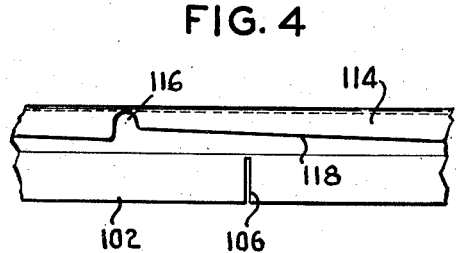
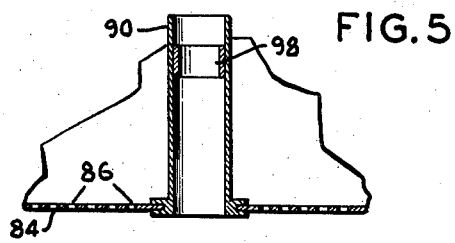
INVENTOR.
SAMUEL H. GEFFNER
BY Henry L. Burkitt
ATTORNEY.

Patented Feb. 21, 1939

2,147,646

UNITED STATES PATENT OFFICE 2,147,646

BEVERAGE BREWING DEVICE

Samuel H. Geffner, Brooklyn, N. Y.

Application June 3, 1936, Serial No. 83,213

4 Claims. (Cl. 53—3)

This invention relates to beverage brewing devices.

The invention will be more particularly described in connection with the making of coffee. Much investigation has been carried on towards discovering the factors important in the preparation of coffee for drinking purposes, wherein all the fragrance of the essential oils is retained, all the detrimental substances which can be extracted are eliminated or reduced to a minimum, and the process of making such coffee may be carried on speedily and without the necessity for any particular technique on the part of the housewife or other person who makes such coffee. It has been found that extraction, if continued over too long a period, and after the first more soluble content has been removed, will result in the separation of the bitter woody substances which also are, to a degree, extractable, but not as readily as the essential oils which enter into the aroma of a good coffee extract. Thus, it has been found necessary to limit the ordinary percolation to as small a time as possible, and such operation has been found not completely efficient, especially where the extract is passed and repassed through the same substance to be extracted. Of course, it is readily to be understood that, as the extractable substance decreases, the liquor in contact with the material to be extracted continues to lose its extracting power, where the liquor which has already passed once is repassed, as in the ordinary coffee percolator.

The "drip" method is a system in which this phase is properly carried out, that is, the liquor in contact with the coffee grounds has always the maximum extracting capacity. However, such apparatus is not automatic, as the heated liquid for extracting must be separately prepared, and then, by manipulation, brought into contact with the coffee grounds.

It is an object of the invention to provide an apparatus which has the desirable functions of both well-known systems of coffee preparation, that is, the "percolator" system and the "drip" system.

The investigations have gone further, and have disclosed the fact that the reheating of the coffee extract is an undesirable procedure. Probably some chemical change takes place. In any event, evaporation of the essential oils occurs, leaving behind a major portion of the bitter extract of the undesirable components. However, the problem generally presented is that of maintaining the extract hot enough for serving. It is an object of the invention to provide a system, and apparatus therefor, for the preparation of coffee, which in itself provides means for maintaining the coffee extract hot after the extracting operation, without any appreciable danger of loss of the essential oils or overheating of the extract.

Other details of the investigation have pointed out that the contact of hot coffee extract with a metallic surface, as, for instance, in the usual aluminum percolator or drip coffee pot, produces a decided deleterious effect upon the final coffee extract. It has been found that the contact of the hot extract with substances such as glass does not have the same effects. It is an object of the invention to provide apparatus for the purposes set forth, in which the coffee extract is not, at least to any appreciable degree, and, if desired, to any degree, brought into contact with any metallic surface.

It is an object of the invention to provide apparatus of the type set forth, by which a body of liquid is heated and automatically feeds itself to pass through coffee grounds, or similar material to be extracted, and then is received in a receptacle capable of being removed from the assemblage and placed for pouring, as, for instance, upon the table, separately from the complete apparatus, as in the nature of a pitcher, in which apparatus this receptacle itself provides a sight to determine the stage of the extraction process.

It is an object of the invention to provide apparatus, of the type set forth, wherein the receptacle may adjustably be arranged at different levels, with regard to the container for the liquid being heated, in order that the extract may be maintained hot without, however, being directly heated, and, by the adjustment, for predetermining the degree to which the extract may be heated.

It is an object of the invention to provide, in a coffee-making apparatus, a retainer for the coffee to be extracted, in which case the residue from the extraction is retained so that it cannot fall into the extract itself. For this purpose, a retainer may be used through which the extracting fluid is to flow, in which case the retainer may be constructed so that all the fluid will be retained in that receptacle, unless it passes directly through the solid to be extracted, to pass then to the receptacle for the extract. The retainer for this purpose may form substantially a complete enclosure so that all fluid entering the retainer will be forced to flow out of the retainer to the receptacle for the fluid only after passage through the retained coffee grounds, and none of these grounds can, by flooding of the retainer or in any other manner, be washed over into the extract.

The apparatus is such that only water which has not previously been used for extraction, that is, clear water, and water which is at boiling temperatures at the moment it is brought into contact with the solid to be extracted, and continuously throughout the extraction process, is used. Furthermore, the solid to be extracted is not first flooded with fluid and then the fluid left to drain off, but there is provided a continuously maintained necessary minimum, for the purpose of continuing the extraction process at all times.

Other objects of this invention will hereinafter be set forth, or will be apparent from the description and the drawings, in which are illustrated certain elements considered pertinent for the demonstration of the invention.

The invention, however, is not intended to be restricted to any particular method of operation, construction, or arrangement of parts, or any product herein shown and described, or to any particular application of any such apparatus, method or product, or to any specific manner of use, or to any of various details thereof, herein shown and described, as the same may be modified in various particulars, or be applied in many varied relations, without departing from the spirit and scope of the claimed invention, the elements herein illustrated and described being merely types showing some of various forms the invention might take for practical purposes.

On the drawings in which the same reference characters refer to the same parts throughout, and in which are shown the elements mentioned;

Fig. 2 is a plan view of the device, a portion being broken away;

Fig. 3 is a transverse, cross-sectional view, to an enlarged scale, on the line 3—3 of Fig. 1;

Fig. 4 is a developed elevational view illustrating the construction of certain interlocking elements of the cover for the coffee-retaining shell; and Fig. 5 is a detail vertical, cross-sectional view of a portion of the construction shown in Fig. 1, as modified, shown to an enlarged scale.

Figure 1:
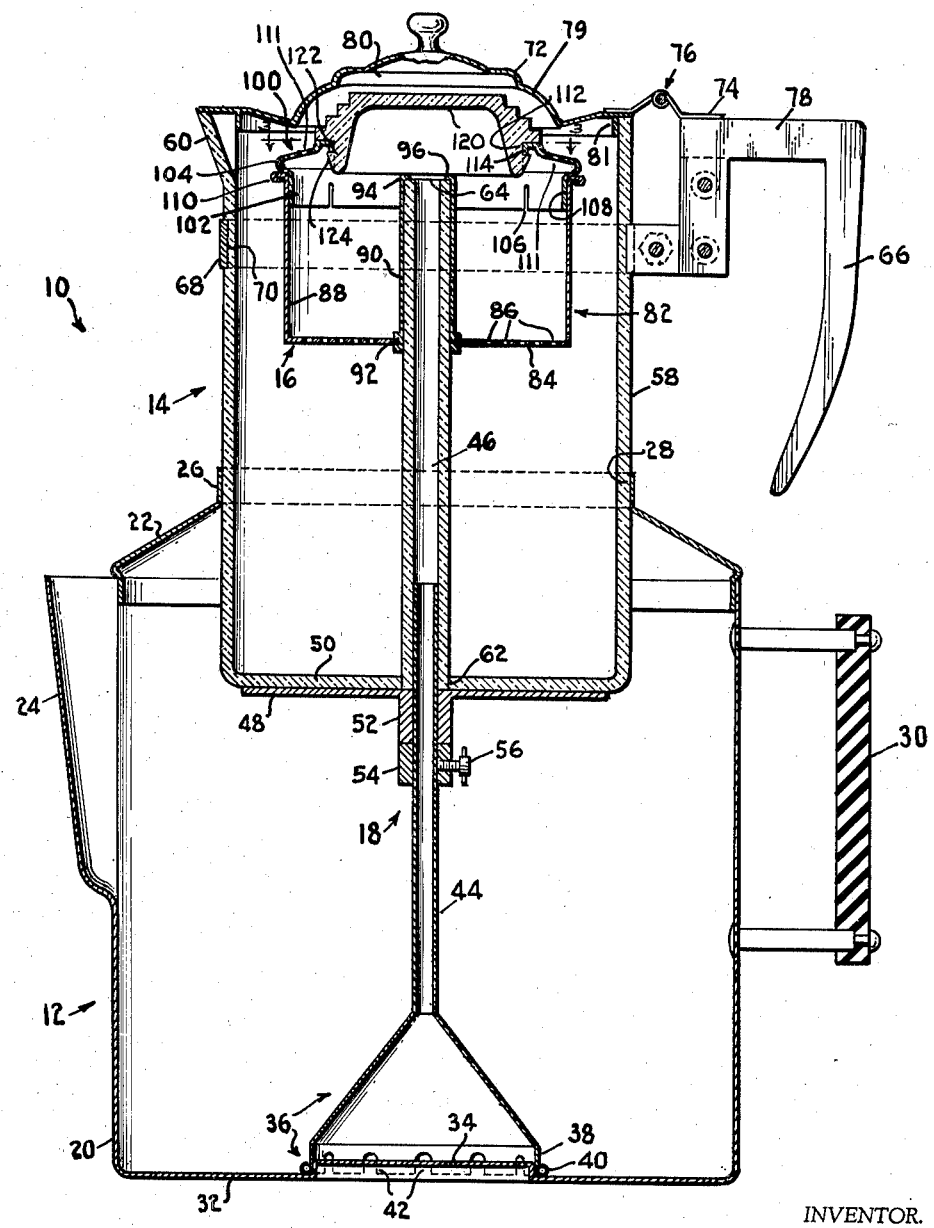
Fig. 1 is a view of a beverage brewing device in accordance with the invention, shown in cross-section vertically on the line 1—1 of Fig. 2, parts being shown in elevation for the sake of clarity.

In the construction shown in the drawings, apparatus 10 is seen to consist of a pot or kettle 12, a receptacle or pitcher 14, and a coffee ground shell 16, with which is associated a column 18. Kettle 12 receives water to be boiled, and forces it through column 18, for passage through shell 16 and the grounds therein retained, the extract finally dripping into pitcher 14.

Kettle 12 may be of any desired construction. This kettle may be of metal, and is preferably so constructed. Since the coffee extract, after it has been produced, never returns to this kettle, there will be no contact, so far as this kettle is concerned, between metal and the extract. The kettle may be a cylindrical member 20, having top 22, which may be of the same material as the kettle itself. The top may be removable, or in any other manner associated with the kettle. A spout 24 may be defined in the body of member 20, and top 22 may be associated with the member so as to permit liquid to be poured out of the kettle through the spout. The top may have a cylindrical section 26, defining an opening 28, through which pitcher 14 may be inserted and extended into kettle 12, in the manner hereinafter to be described. The diameter of opening 28 is preferably such that substantially a snug sliding fit between section 26 and pitcher 14 will follow. A handle 30 may be secured to member 20, preferably diametrically opposed to spout 24, in order that the entire apparatus may be manipulated as desired.

In bottom 32 of kettle 12 there may be produced an inwardly directed raised portion 34 to cooperate with the lower end section 36 of column 18. Section 36 is shown as substantially conical in the major portion of its body, with a substantially cylindrical end section 38 having a beaded edge 40 for positioning over and for association with portion 34. Kerfs 42 may be formed through edge 40 and parts of section 38, to permit liquid within the kettle to pass within the column. At the upper end of the cone, there is secured a tube 44 which extends therefrom vertically upwardly. This tube may extend the entire height that it is possible for the fluid to move in passage from kettle 12 to shell 16. However, it has been found desirable to foreshorten tube 44 and merely provide a sufficient length of tube to cooperate with a central duct 46 associated with pitcher 14, to stabilize that pitcher in the further association of the pitcher with the apparatus.

In order to support pitcher 14 in the association to be described, a plate 48 is provided. This plate may be of metal, and be substantially a disc, wide enough to receive the bottom 50 of the pitcher, and stably to support the pitcher when so received. A collar 52 may be secured to the bottom face of the plate, to cooperate with tube 44, about which this collar is received. A sleeve 54 may be received upon tube 44, and by means of a suitable device, such as a set-screw 56, may be fixed in position along the extent of tube 44. Collar 52 will come to rest upon the upper edge of sleeve 54, and thus the adjustment of sleeve 54 along tube 44 may be used for varying the height of plate 48, and, in the same manner, of the pitcher supported on the plate.

The pitcher, for the purposes of this invention, is preferably of glass. It is to be understood, of course, that, for certain purposes of the invention, other materials may be used, but a desired form is that in which the pitcher, and substantially all its other component parts, are of heat-proof glass. In this case, the pitcher is a cylindrical member 58 having a spout 60 at its upper end. Duct 46, in the preferred construction, is substantially integral with bottom 50. For such purpose, a tube of glass, similar to that from which the pitcher itself is made, may be fused to and made integral with the bottom, at an opening 62 through the bottom. In this manner, a closed receptacle is provided, through which a vertical passage extends. As shown in the drawings, duct 46 is intended snugly to fit over tube 44, and at any position of the pitcher within the kettle, there will be such a snug interfitting of tube and duct that liquid expelled from the tube will be forced to continue upwardly through the duct, to discharge through its upper extreme end 64.

For carrying the pitcher, a handle 66 may be provided. This handle may be secured to the pitcher by means of an elastic strap 68, as, for instance, of metal, extended around the pitcher. The strap may be retained in position, if desired, by being received within a circumferential groove 70, into which it is tightened. Handle 66 may be of any suitable heat-insulating material, as, for instance, wood or Bakelite.

This handle may be used as means for supporting a cover 72 for the pitcher. In this case, one half 74 of a hinge 76 is secured to the upper arm 78 of the handle. The other half of the hinge may be secured directly to the dished plate 79 of the cover, which plate may have a downwardly directed flange 81 to cooperate with the top of member 58 to locate the cover properly in position. The plate may be formed with an outwardly directed recess 80 immediately over upper end 64 of duct 46. This recess provides a means for stopping the upward projection of fluid through column 18, and properly directing such fluid into shell 16. If desired, the cover may be of metal throughout, as, even at this point, no extracted liquor can come in contact with a metal surface. However, recess 80 may be defined by a glass sight if so desired. The cover may extend completely over the pitcher, and even the spout 60.

Shell 16 may be of any desired material. It may be formed of glass, if so desired. However, the period of contact of the extracted liquor will be so short, so far as this shell is concerned, that it may be of metal. The shell consists, therefore, of a cylindrical member 82 having a bottom 84 provided with a plurality of perforations 86 through which the liquor may fall into the pitcher. If desired, perforations may also be provided in side walls 88, but, for more efficient extraction, it is considered that such latter perforations are unnecessary, and, in some cases, undesirable. A sleeve 90, formed to fit snugly around the upper end of duct 46, may be secured in bottom 84 in any desired manner. For instance, such sleeve may be formed with a shouldered end, to be inserted through an opening 92 in bottom 84, and then to be riveted over. The upper end 94 of sleeve 90 may, as shown in Fig. 1, be formed with an inwardly directed flange 96, so that, when sleeve 90 is slipped over duct 46, the arrangement will be supported by the engagement of flange 96 with upper end 64.

Another construction, that shown in Fig. 5, involves the use of a short sleeve 98, of such size that it will fit snugly within the bore of sleeve 90, into which it is pushed to such height as it may be determined will be the most desirable so that the lower end of sleeve 98 will form a stop to support the shell upon the end of duct 46. Thus, it is possible, easily and simply, to determine in use the exact position with relation to the duct where the shell shall be positioned for efficient cooperation between shell and fluid being directed upwardly from the kettle. A cover 100 may be formed from metal to have a depending flange 102 with a beaded rim 104. Flange 102 may have one or more notches 106, as it may be found desirable, for imparting flexibility to that metal, as this flange is intended to be inserted into the mouth 108 of shell 16, to have a snug fit with the shell. At the same time, rim 104 will abut the turned out flange 110 formed at the upper end of shell 16, and limit the downward movement of the cover into the shell. One or more openings 111 may be formed through cover 100 near flange 110. At an opening 112 formed in the cover, a flange 114 may be defined, in which flange one or more notches 116, from which lead away cam edges 118, may be formed. A glass or similar deflector 120 may be used in connection with this opening 112, being retained in position by insertion into the opening. Deflector 120 may be a cup-shaped member having an external shoulder 122 formed at its external face adjacent the opening of the cup, at which shoulder may be provided lugs 124, of such extent that they may be passed through opening 112 at notches 116, but not at any other portion of flange 114. After insertion of deflector 120 through the opening, and on turning the deflector to bring lugs 124 firmly into engagement with cam edges 118, the deflector is locked in position and so retained.

In operation, after the coffee grounds have been placed in shell 16, and water has been brought to boiling in the kettle, percolating action will set in. Water and steam will be discharged up through tube 44 into duct 46 and against deflector 120. Then the fluid will percolate down through the coffee grounds in the shell, and finally drip into the pitcher. When liquid is discharged into shell 16 from duct 46, that liquid's only escape from the shell is through perforations 86. Furthermore, as liquid is discharged into the shell, the liquid head tends to increase, thus producing a positive force to cause the movement of the liquid through the coffee solid in the shell, and expediting the extraction process.

The temperature in the pitcher can never rise above the temperature of the water in the kettle. By adjusting the height of plate 48, the degree to which the extract in the pitcher can be heated may be regulated, as the higher the pitcher, the less surface is in contact either with steam or the boiling water, so that there is less heat transfer. The result will be that the extract will be maintained hot without the violent boiling which is taking place in kettle 12 throughout the extracting process.

After a predetermined amount of liquor is seen to have been collected in the pitcher, the pitcher may be removed merely by lifting it out of the kettle. After its outer surfaces have been wiped, the pitcher itself may be used for serving at the table. If the user should so desire, although it is not necessary, shell 16 may also be removed before serving takes place. No liquid can find its way into duct 46 during the service, nor can grounds, at any time, find their way into the extract. Throughout the extracting stage, tube 44 and duct 46 cooperate as one continuous passage. By the cooperation of the column with the pitcher, by means of plate 48 and cylindrical section 26, the entire arrangement is stable throughout the extracting stage.

Many other changes could be effected in the particular elements designed, and in the methods of operation and use, and in the apparatus, and in the article manufactured, herein set forth, and in specific details thereof, without substantially departing from the invention intended to be defined in the claims, the description being merely of elements illustrating certain phases of the spirit of the invention.

What is claimed as new and useful is:—

1. A device for preparing coffee by percolation, which includes: a container for containing and heating water; a receptacle for the percolated coffee; a percolator column extending upwardly within the container; a rest plate adjustable along the column; the receptacle having a tube extending upwardly therethrough from the receptacle bottom; the container having an opening through its top wall, the receptacle being positioned with its bottom extending through the opening and resting on the rest plate; the column and the tube, regardless of the adjusted position of the rest plate, cooperating to form a continuous duct from the bottom of the container substantially to the top of the receptacle; the receptacle and the tube being integrally formed of glass; a perforate coffee receiver, the receiver having means to support it upon the tube so that liquid discharging upwardly from the tube will fall into and percolate through the receiver to drip into the receptacle, the receiver providing means for retaining a charge of ground coffee during percolation; the container and the receptacle having individual handles; and a cover for the receptacle.

2. A device for preparing coffee by percolation, which includes: a container for containing and heating water, a receptacle for the percolated coffee, a percolator column extending upwardly within the container, a rest plate adjustable along the column, the receptacle having a tube extending upwardly therethrough from the receptacle bottom, the container having an opening through its top wall, the receptacle being positioned with its bottom extending through the opening and resting on the rest plate, the column and the tube cooperating to form a continuous duct from the bottom of the container substantially to the top of the receptacle, a perforate coffee receiver, the receiver having means to support it so that liquid discharging upwardly from the tube will fall into and percolate through the receiver to drip into the receptacle, the receiver providing means for retaining a charge of ground coffee during percolation, and a cover for the receptacle.

3. A device for preparing coffee by percolation, which includes: a container for containing and heating water, a receptacle for the percolated coffee, a percolator column extending upwardly within the container, a rest plate adjustable along the column, the receptacle having a tube extending upwardly therethrough from the receptacle bottom, the container having an opening through its top wall, the receptacle being positioned with its bottom extending through the opening and resting on the rest plate, the column fitting within the tube, a perforate coffee receiver, the receiver having means to support it upon the tube so that liquid discharging upwardly from the tube will fall into and percolate through the receiver to drip into the receptacle, the receiver providing means for retaining a charge of ground coffee during percolation, and a cover for the receptacle.

4. A device for preparing coffee by percolation, which includes: a container for containing and heating water; a receptacle for the percolated coffee; the container having an opening through its top wall; the receptacle being supported so that its bottom extends into the container through and fits substantially snugly in the opening, and is at all times in a predetermined relation to the bottom of the container; a percolator column extending upwardly within the container; the receptacle having a tube extending upwardly from the receptacle bottom and through the receptacle; a perforate coffee receiver; the receiver providing means for retaining a charge of ground coffee during percolation; the receiver having means to support it upon the tube so that liquid discharging upwardly from the tube will fall into and percolate through the receiver to drip into the receptacle; the column fitting within the tube, when the receptacle is supported with its bottom extending into the container, with the column extending a short distance into the bore of the tube, and forming with the tube a single conduit for the passage of water upwardly through the column from the container to the receiver so that water entering the column at the container must pass successively through the column and then discharge into the tube; the column and tube forming a single continuous conduit of predetermined length, and both functioning as water-carrying elements; and a cover for the receptacle.

SAMUEL H. GEFFNER.